March 30, 1943.    C. H. KING ET AL    2,315,431
NONSPILL VENT PLUG
Filed July 26, 1941
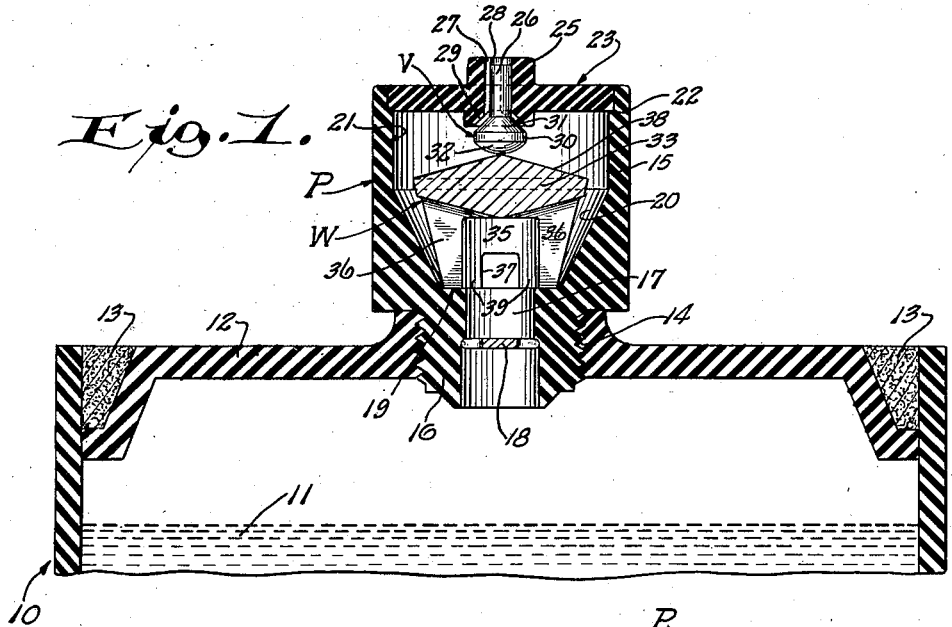
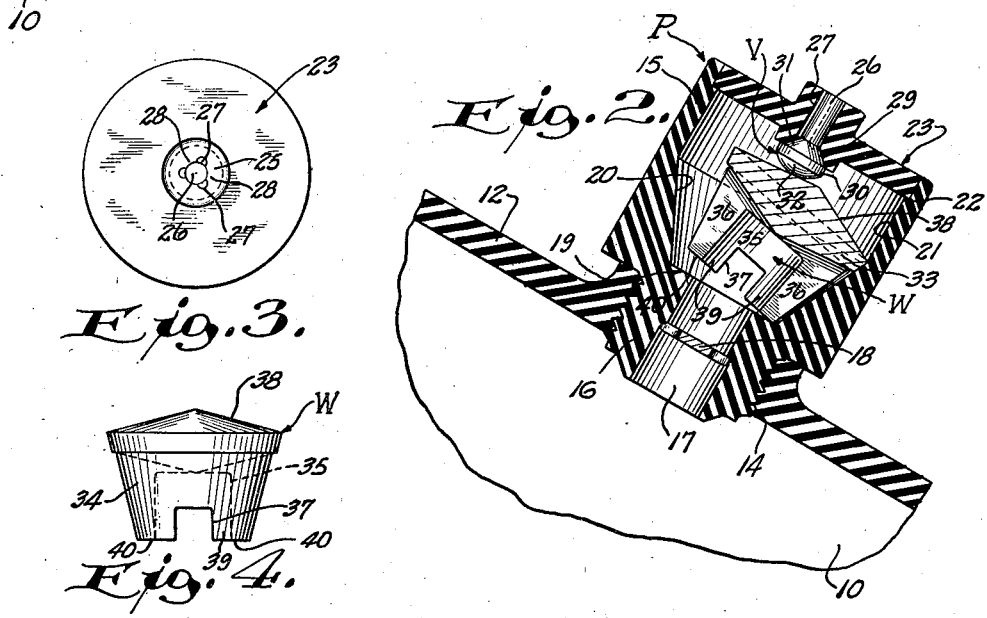
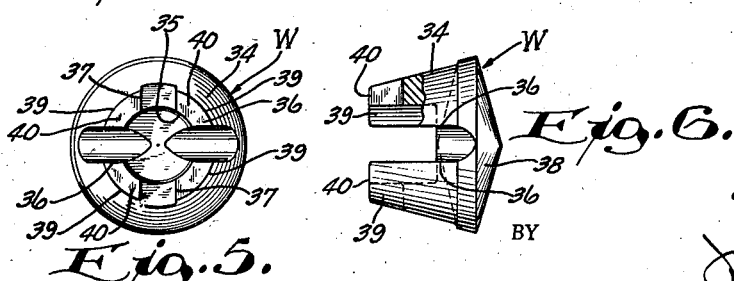
INVENTOR.
GEORGE C. APPEL
CARL H. KING.
BY
ATTORNEY.

Patented Mar. 30, 1943

2,315,431

UNITED STATES PATENT OFFICE 2,315,431

NONSPILL VENT PLUG

Carl H. King and George C. Appel, Milwaukee, Wis., assignors to Globe-Union Inc., Milwaukee, Wis., a corporation of Delaware Application July 26, 1941, Serial No. 404,108

4 Claims. (Cl. 137—139)

This invention relates to a non-spill vent plug for storage batteries containing a liquid electrolyte and of the type which automatically closes the plug and seals the battery cell to prevent escape of the liquid electrolyte when the battery is tilted beyond a predetermined angle in any direction. Such a vent plug is especially advantageous for use with airplane batteries, and in aircraft used for military purposes is a practical necessity as the storage batteries of such aircraft are not only frequently steeply tilted, but are at times inverted.

The object of the invention is to simplify and compact the construction of such a plug, the number of parts being kept to the very minimum; to insure efficient and reliable action of the plug at all times, the operating elements of the plug being enclosed and protected and being constituted to provide for venting of the cell when the battery is in, or is approximately in, its normal upright position, and yet automatically and securely closing the plug and sealing the cell whenever the battery is tilted beyond a predetermined angle in any direction; and to provide for rapid and complete drainage of any of the liquid electrolyte that flows into the plug upon inversion of the battery back into the cell when the battery is restored to its normal upright position.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1 is a fragmentary view in transverse vertical cross section, illustrating a non-spill vent plug embodying the present invention combined with the cover of a cell of a storage battery and showing the battery in its normal upright position and the vent plug open;

Figure 2 is a view similar to Figure 1, but showing the storage battery tilted and the vent plug closed;

Figure 3 is a view in top plan of the vent plug per se;

Figure 4 is a view in side elevation of the tiltable valve-operating weight;

Figure 5 is a view in bottom plan of the tiltable weight shown in Figure 4; and

Figure 6 is a view partly in elevation, with parts broken away and shown in cross section to further illustrate the structure of the tiltable valve-operating weight.

Referring to the drawing, the numeral 10 designates upper portions of the vertical walls of a cell of a storage battery of the type containing a liquid electrolyte 11. A cover 12 is provided and is sealed in place by sealing compound 13. The cover 12 is provided with an internally threaded vent opening 14.

A vent plug, designated generally at P, is provided and comprises a generally cylindrical hollow body portion 15 having an externally threaded connecting nipple 16 integral with its lower end and threaded into the vent opening 14 of the cover 12. The nipple 16 is formed with an axial passageway 17 affording communication between the interior of the hollow body portion 15 of the plug P and the interior of the cell. A perforated baffle disk 18 may be provided in this passageway, if desired. The interior of the hollow body portion 15 of the vent plug P is formed with an annular ledge 19 around the margin of the upper end of the passageway 17. The inner peripheral wall of the hollow body portion 15 flares or slopes upwardly and outwardly as at 20 from the ledge 19 and merges into an upper inner peripheral wall portion 21 of cylindrical form. The upper open end of the body portion 15 is recessed or rabbetted, as at 22, around its inner edge to receive and interfit with the periphery of a cap or cover plate, designated generally at 23. The cap or cover plate 23 is releasably secured in position in any suitable way.

The cap plate 23 is provided with a vent tube 25 at its center, the tube 25 preferably being integral with the body of the cap plate 23 and projecting above and below the top and bottom sides thereof. The opening through the tube 25 is of special shape in cross section to provide vent ducts or vent passages from the interior of the hollow plug body 15 to the atmosphere, and also a guide for the stem 26 of a valve, designated generally at V. For these purposes, the inner peripheral wall of the tube 25 is provided with angular spaced grooves 27 extending longitudinally of the tube 25 from one end thereof to the other, the portions of the inner periphery of the tube 25 intermediate said grooves providing guide surfaces 28 slidably engaged with the stem 26 of the valve V. At the lower or inner end of the tube 25, and around the margin of the opening therethrough, a valve seat 29 is formed. Preferably the valve seat 29 is conical in form. The valve V includes a valve head 30 with which the valve stem 26 is integral. The valve head 30 has a conical valve face 31 engageable with the valve seat 29 in the closed position of the valve V to block completely the vent passages 27, and in fact the entire opening through the vent tube 25, thereby sealing the cell with which the vent plug P is combined.

The stem 26 of the valve V is a floating sliding fit in the tube 25, and its position (open or closed) is controlled by means of a tiltable valve-operating member, preferably in the form of a tiltable weight, designated generally at W. To adapt the valve V to respond to the control of the tiltable weight W the underside 32 of the valve head 30 is spherical in form.

The tiltable weight W is of lead or other suitable heavy inert metal, and is formed with a head 33 of considerable size and a downwardly and inwardly tapering body portion 34. The body 34 is hollowed out as at 35 and is provided with a pair of long diametrically opposite slots 36 and also with a pair of short diametrically opposite slots 37, the slots 37 being angularly spaced from the slots 36. With this construction the center of gravity of the weight is located well up toward the top thereof to render the weight appropriately unstable and insure its tilting from the position shown in Figure 1 to the position shown in Figure 2 upon tilting of the battery beyond a selected predetermined angle (with the present design twenty degrees) in any direction. The top surface 38 of the head 33 is in the form of a flat cone. The spherical underside 32 of the valve head 30 rides on this conical surface 38 and has point contact therewith, the spherical surface 32 of the valve head 30 engaging the apex of the conical surface 38 of the head 33 of the weight W in the open position of the valve V, and with some other point on this surface in the closed position of the valve V. The slots 36 and 37 in the body portion of the weight W provide its lower end with four angularly spaced supporting feet 39 having flat undersurfaces 40 which engage the ledge 19 when the battery is upright, as illustrated in Figure 1. When the battery is tilted the weight W rocks about the outer edge of the flat undersurface 40 of one of the feet 39, in the manner illustrated in Figure 2, until the stop surface 41 on the head 33 of the weight engages the cooperable stop structure afforded by the upper portion of the outwardly flaring portion 20 of the inner periphery of the hollow body portion 15 of the vent plug P.

With this construction, when the battery is tilted beyond a predetermined angle in any direction, the tiltable weight W automatically closes the valve V and seals off the cell. If the battery is tilted beyond a certain degree, or if it is inverted, the electrolyte will run into the interior of the hollow body portion 15 of the vent plug P, but upon return of the battery to its normal upright position any electrolyte in the hollow body portion of the plug P will rapidly drain back into the cell. Such drainage is insured by the provision of the slots 36 and 37 and which serve not only to aid in properly positioning the center of gravity of weight and to provide the desirable supporting foot structure, but also serve as drain slots. Moreover, by having the slots 36 and 37 of different height, an unbalanced hydrostatic head obtains in the liquid electrolyte in the hollow body portion 15 of the plug P, and this unbalanced condition insures rapid drainage.

While we have shown and described one construction in which the invention may be advantageously embodied, it is to be understood that the construction shown has been selected merely for the purpose of illustration or example, and that various changes in the size, shape, and arrangement of the parts may be made without departing from the spirit of the invention as defined in the subjoined claims.

We claim:

1. A non-spill vent plug for a storage battery containing liquid electrolyte and comprising a hollow body portion having its interior in communication with the interior of a cell of a battery and having a vent tube at its outer end establishing communication between the interior of the hollow body portion and the atmosphere and also provided with a valve seat, a valve disposed within the hollow body portion having a valve face cooperable with said valve seat, and a tiltable valve-actuating weight disposed within and supported on the hollow body for tilting movement and having a camming surface cooperable with the valve to move the same automatically to closed position when the plug is tilted beyond a predetermined angle in any direction, said tiltable valve-actuating weight having slots therein extending out through the lower end thereof and of different heights to facilitate drainage of electrolyte from the interior of the body portion back into the battery cell.

2. A non-spill vent plug for a storage battery containing liquid electrolyte and comprising a hollow body portion having its interior in communication with the interior of a cell in the battery and having a vent tube at its outer end establishing communication between the interior of the hollow bushing portion and the atmosphere and also provided with a valve seat, a valve disposed within the hollow body portion, slidably guided in the tube and also having a valve face cooperable with said valve seat, a tiltable valve-actuating weight having a head and formed with a camming surface on which the valve rides and also having an inwardly tapered body portion provided with vertical slots, the slots providing supporting feet at the lower end of the body portion, said hollow body portion of the vent plug having a ledge on which said feet are rockably supported, said slots being of different heights to facilitate drainage of electrolyte from the interior of the body portion back into the battery cell.

3. A non-spill vent plug for storage batteries containing a liquid electrolyte and comprising a hollow body portion having an externally threaded nipple at one end adapted to be connected with the vent opening of the cell cover of a battery, said body portion having a ledge surrounding the margin of the passage through the nipple, a vent tube at the outer end of the body portion establishing communication between the interior of the body portion and the atmosphere, said vent tube being provided with a valve seat, a valve having a valve face cooperable with said valve seat, said valve being slidably guided in the vent tube and having a rounded inner end, and a tiltable valve-actuating weight disposed with the hollow body portion and having a head and having an inwardly tapering body portion provided with vertical slots, the slots providing supporting feet at the lower edge of the body portion which are rockably supported on said ledge, the upper surface of the head being of conical form, the rounded lower end of the valve riding on the conical upper surface of the head, said slots being of different heights to facilitate drainage of electrolyte from the interior of the body portion back into the battery cell.

4. A non-spill vent tube for storage batteries comprising a hollow body portion having an externally threaded nipple at one end adapted to be connected with the vent opening of a battery with its interior in communication with the interior of the battery cell, the inner end of the hollow body portion having an internal annular ledge, a vent tube at the outer end of the hollow body portion establishing communication between the atmosphere and the interior of the hollow body portion, said vent tube being provided with an inwardly facing valve seat at its inner end, a valve disposed within the hollow body portion and having a valve stem slidably guided in the vent tube and also having a valve face cooperable with said valve seat, the inner end of the valve being of spherical form, and a tiltable valve-actuating weight disposed within the hollow body portion and including a head and an inwardly tapering body provided with vertical slots, the slots providing supporting feet at the lower edge of the body which are rockably supported on said ledge, the upper surface of the head of the weight being in the form of a flat cone and in wiping point-to-point contact with the spherical inner end of the valve.

CARL H. KING.
GEORGE C. APPEL.